Sept. 15, 1970  A. F. BAUER  3,528,706
DIE CAST ALUMINUM VEHICLE WHEEL
Filed July 25, 1968
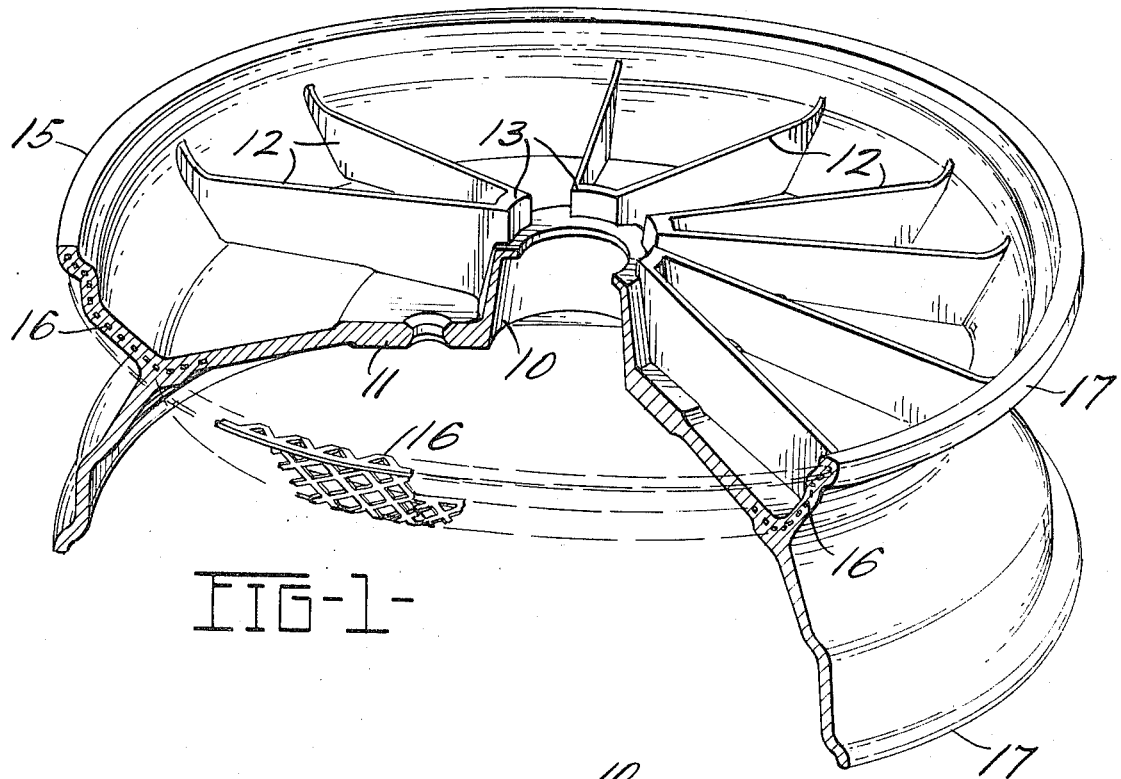
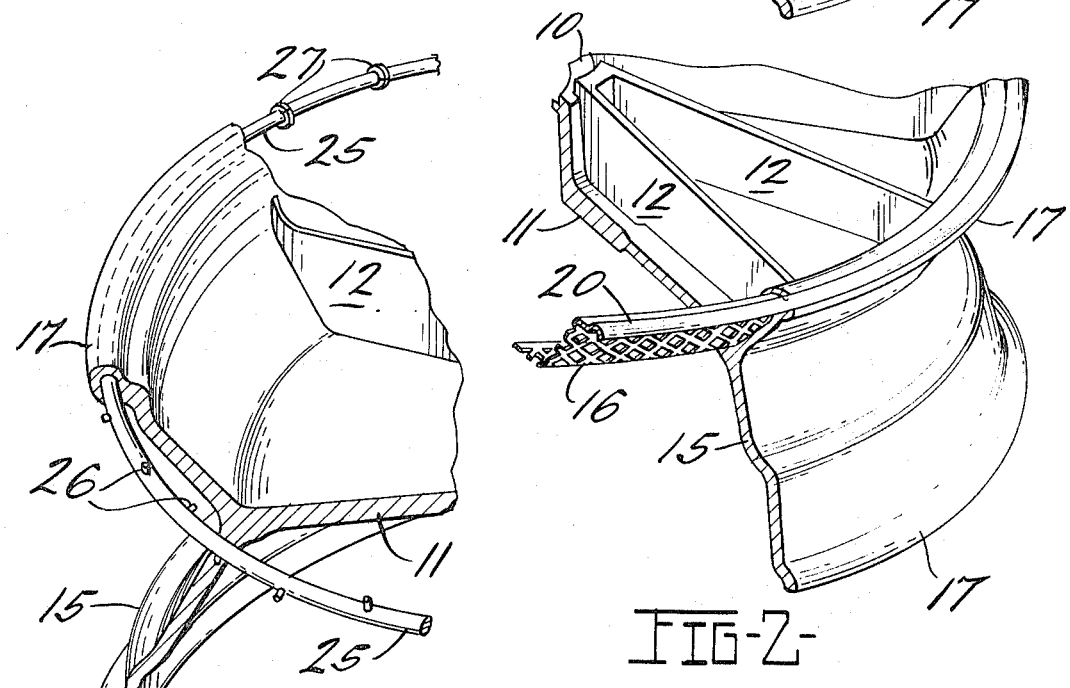
INVENTOR:
ALFRED F. BAUER.
BY
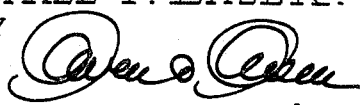
ATT'YS.

United States Patent Office 3,528,706
Patented Sept. 15, 1970

3,528,706
DIE CAST ALUMINUM VEHICLE WHEEL
Alfred F. Bauer, Toledo, Ohio, assignor to National Lead Company, New York, N.Y., a corporation of New Jersey
Filed July 25, 1968, Ser. No. 747,588
Int. Cl. B60b 3/06, 3/02
U.S. Cl. 301—65                 5 Claims

ABSTRACT OF THE DISCLOSURE

A die cast vehicle wheel made of aluminum or other light metal alloy having reinforcement in the area most subject to impact damage.

---

This invention relates to vehicle wheels and is particularly directed to a wheel that is die cast in alloys of aluminum or other light metal alloys, suitably reinforced.

So-called aluminum wheels that are available at the present time have only the spoke portions of the wheel formed of aluminum with the rim being made from the usual steel stampings. These wheels, therefore, are unduly heavy in the area of greatest radius and mass. Since the center of such a wheel, at the end of the spoke area, must be joined to the steel rim by welding, provision must be made for the spoke area to include a steel insert having an exposed portion at the outside of each spoke by which the welding attachment can be made to the steel rim. Such an assembled wheel has many disadvantages from the standpoint of cost of manufacture, difficulty of balance, etc. All of these disadvantages are overcome by die casting a wheel that is a single, appropriately reinforced unit.

In the attached drawings:

FIG. 1 is a perspective view, with parts broken away, showing a vehicle wheel in accordance with the present invention;

FIG. 2 is a cross-sectional view showing a modified form of the invention; and

FIG. 3 is a perspective view showing an additional modification of the invention.

The wheels shown in the drawings all comprise a hub 10 at the center of a wheel disk 11, the disk being reinforced by a plurality of spokes 12 radiating outwardly. The spokes 12 lie in planes parallel to the axis of the wheel and in a preferred form are joined together in pairs by webs 13 adjacent the hubs.

The main wheel disk 11 and spokes 12 terminate in a tire carrying rim 15, the cross-sectional configuration of which is conventional to receive a vehicle tire. On the outside of the wheels the rim 15 may come into forcible contact with curbs or other obstructions and is thus subject to impact damage. Aluminum die castings may not possess enough strength to resist permanent deformation in this area, and the present invention is directed to improving the strength of the casting principally at this point. The improvement is derived from steel inserts which may take various forms.

The first insert form is shown in FIG. 1 and includes a body of foraminous material 16 such as an expanded ferrous metal sheet. The expanded metal is first pressed to the desired form to coincide with the configuration of the curb side of the rim 15 extending from the outer rim flange inwardly towards the hub at least to the plane of the main wheel disk 11. If desired, the expanded metal reinforcement 16 may extend inwardly within the disk 11 all the way to the hub 10. The reinforcement of the rim in the area of possible damage by curb contact is especially significant. The tire carrying rim 15 has spaced tire bead retaining flanges 17 and a continuous outer periphery (see FIG. 1). The reinforcement 16 is at least partially cast within and embedded in at least one of the tire bead retaining flanges 17 of the tire carrying rim 15. As shown in FIG. 1, the reinforcement 16 extends circumferentially around the outer periphery of the rim 15.

If the ferrous metal reinforcement material comprises stainless steel, an unexpanded portion of a reinforcement sheet, designated 20 in FIG. 2 may be placed in the die in position to form a wall of the casting and thus exposed at the maximum rim diameter where curb engagement and damage are most likely to occur. The remainder of the reinforcement sheet is embedded within the casting as in FIG. 1.

A simpler and less expensive reinforcement for the edge of the rim 15 is shown in FIG. 3 and comprises a hoop of wire 25 having spacer elements in the form of aluminum studs 26 extending radially away from the wire or rings 27 surrounding the wire. The spacer elements act to locate the wire with respect to the walls of the die cavity in which the wheel is formed. The elements thus assure that the hoop will be properly embedded at the desired location for maximum reinforcement.

In manufacturing a wheel in accordance with the present invention, the reinforcement element in the form of the expanded metal sheet shown in FIGS. 1 and 2 or the wire hoop 25 shown in FIG. 3 is first cut and fabricated to the proper dimensions and configuration. In the case of the expanded metal reinforcement the dies used for forming the sheet to its proper configuration will be of much the same general cross section as the wheel as indicated in FIG. 2. In the case of the wire hoop 25, the reinforcement may be formed into a simple ring and the ends of the wire forming the hoop need not even be joined together but may abut each other in the casting die.

When the reinforcement element has been formed, it can be placed in the die casting die and the shot made. When the casting is completed and ejected from the die, the reinforcing element will be suitably embedded in it adjacent the outer periphery of the wheel and no portion of the reinforcement will be exposed except where the element has been deliberately placed immediately adjacent the wall of the cavity as in the instance of the stainless steel insert shown in FIG. 2.

The resulting die casting will have the appearance of a complete aluminum wheel with all of the advantages in weight and appearance. Further, the necessity of welding a steel rim to an aluminum center spider is avoided. The one-piece casting is, of course, more economical to manufacture in large quantities than would be the assembled wheels previously known.

What I claim is:

1. A vehicle wheel comprising a die cast body of light metal alloy, said die cast body including a circular disk member and a tire carrying rim having spaced tire bead retaining flanges integrally cast with said disk member, said tire carrying rim having a continuous outer periphery, and a reinforcing member at least partially cast within and embedded in at least one of said tire bead retaining flanges of said tire carrying rim adjacent said outer periphery thereof, said reinforcing member extending circumferentially around said outer periphery.

2. A vehicle wheel in accordance with claim 1 in which said reinforcing member comprises a foraminous ferrous sheet.

3. A vehicle wheel in accordance with claim 1 in which said reinforcing member comprises a sheet of foraminous ferrous metal having a continuous reinforcing rim, said continuous reinforcing rim extending outwardly from said tire carrying rim, whereby said reinforcing rim is at least partially exposed from the die casting.

4. A vehicle wheel in accordance with claim 1 in which said reinforcing member comprises an embedded hoop of ferrous metal.

5. A vehicle wheel in accordance with claim 2 in which said reinforcing member extends from a location adjacent said outer periphery of said tire carrying rim radially inwardly into at least a portion of said disk member.

References Cited

UNITED STATES PATENTS

| | | | |
|---|---|---|---|
| 942,400 | 12/1909 | Montupet. | |
| 2,008,933 | 7/1935 | Sinclair | 301—65 |
| 2,734,778 | 2/1956 | Cook | 301—6 X |
| 3,016,269 | 1/1962 | Delorean | 301—65 X |
| 3,361,484 | 1/1968 | Frank | 301—65 |

RICHARD J. JOHNSON, Primary Examiner